US012705003B2

(12) United States Patent
Murakami et al.

(10) Patent No.: US 12,705,003 B2
(45) Date of Patent: Aug. 11, 2026

(54) IMAGE FORMING SYSTEM

(71) Applicant: SHARP KABUSHIKI KAISHA, Sakai City (JP)

(72) Inventors: Kohichi Murakami, Sakai City (JP); Yasuhiro Nakai, Sakai City (JP); Yasutomo Hayano, Sakai City (JP); Masao Saeda, Sakai City (JP)

(73) Assignee: SHARP KABUSHIKI KAISHA, Sakai City (JP)

(*) Notice: Subject to any disclaimer, the term of this patent is extended or adjusted under 35 U.S.C. 154(b) by 314 days.

(21) Appl. No.: 18/661,063

(22) Filed: May 10, 2024

(65) Prior Publication Data

US 2024/0377994 A1 Nov. 14, 2024

(30) Foreign Application Priority Data

May 11, 2023 (JP) ................................ 2023-078836

(51) Int. Cl.
*G06F 3/12* (2006.01)

(52) U.S. Cl.
CPC .......... *G06F 3/1204* (2013.01); *G06F 3/1238* (2013.01); *G06F 3/1253* (2013.01); *G06F 3/1273* (2013.01); *G06F 3/1285* (2013.01)

(58) Field of Classification Search
CPC .... G06F 3/1204; G06F 3/1238; G06F 3/1253; G06F 3/1273; G06F 3/1285; G06F 3/1222
USPC ........................................................ 358/1.14
See application file for complete search history.

(56) References Cited

U.S. PATENT DOCUMENTS

| | | | | |
|---|---|---|---|---|
| 11,552,949 B2 * | 1/2023 | Katsuragi | H04L 51/08 | |
| 12,081,717 B2 * | 9/2024 | Ito | H04N 1/00517 | |
| 2009/0310178 A1 * | 12/2009 | Tomita | G06F 3/1263 | 358/1.15 |
| 2013/0208893 A1 * | 8/2013 | Shablygin | H04L 9/0894 | 380/277 |

FOREIGN PATENT DOCUMENTS

JP 2013-132893 A 7/2013

* cited by examiner

*Primary Examiner* — Allen H Nguyen
(74) *Attorney, Agent, or Firm* — ScienBiziP, P.C.

(57) ABSTRACT

An image forming system includes: a server; a user terminal; and an image forming device, wherein the server includes: a server storage that stores print data in association with user authentication information; and a code issuer that issues a code, the server transmits the code, and, acquires the print data and transmits the print data, the user terminal includes: a terminal display, the image forming device includes: a code reader that reads the code; a display; an operation acceptor that accepts a command; and an image former, and the image forming device, when the code reader acquires the user authentication information, transmits the user authentication information, when the print data is received, displays a print setting screen, when the operation acceptor accepts a print setting, displays a print setting completion screen, and, when the operation acceptor accepts a print command, causes the image former to form an image.

4 Claims, 17 Drawing Sheets

FIG. 14

| FILE EXTENSION | PRINT TIMING | FILE NAME | PRINT SETTING |
|---|---|---|---|
| docx | 2021/10/1 | OO SPECIFICATION Ver,1 | COLOR, A4 PAPER, DOUBLE-SIDED, 5 COPIES |
| docx | 2022/4/1 | OO SPECIFICATION Ver,2 | COLOR, A4 PAPER, DOUBLE-SIDED, 5 COPIES |
| xlsx | 2022/8/5 | MINUTES OF REGULAR SALES MEETING 20220805 | MONOCHROME, A4 PAPER, SINGLE-SIDED, 1 COPY |
| xlsx | 2022/8/12 | MINUTES OF REGULAR SALES MEETING 20220812 | MONOCHROME, A4 PAPER, SINGLE-SIDED, 1 COPY |
| xlsx | 2022/8/19 | MINUTES OF REGULAR SALES MEETING 20220819 | MONOCHROME, A4 PAPER, SINGLE-SIDED, 1 COPY |
| xlsx | 2022/8/26 | MINUTES OF REGULAR SALES MEETING 20220826 | MONOCHROME, A4 PAPER, SINGLE-SIDED, 1 COPY |
| xlsx | 2022/9/2 | MINUTES OF REGULAR SALES MEETING 20220902 | MONOCHROME, A4 PAPER, SINGLE-SIDED, 1 COPY |
| pptx | 2022/8/30 | HANDOUT OF CORPORATE PLANNING MEETING, SECOND HALF OF 2021 | COLOR, A4 PAPER, DOUBLE-SIDED, 2 COPIES |
| pptx | 2022/8/30 | HANDOUT OF CORPORATE PLANNING MEETING, FIRST HALF OF 2022 | COLOR, A4 PAPER, DOUBLE-SIDED, 2 COPIES |

IMAGE FORMING SYSTEM

CROSS-REFERENCE TO RELATED APPLICATION

The present application claims priority from Japanese Application JP2023-078836, the content to which is hereby incorporated by reference into this application.

BACKGROUND OF THE INVENTION

1. Field of the Invention

The present disclosure relates to an image forming system.

2. Description of the Related Art

Conventionally, a print service in which, when a user accesses a print service system on a network to perform printing, the user selects an image forming device that the user wants to use from a list of image forming devices such as multifunction peripherals (MFPs) registered in advance in association with user information to perform printing has been provided.

In such a print service, an image forming device that, when a user succeeds in user authentication in the image forming device, acquires from a print service system on a network and displays a list of registered names of image forming devices registered in the print service system as image forming devices used by the user, accepts a selection of an image forming device as a print output destination from the list, and, when there is an image forming device consistent with the selected image forming device, selects the image forming device as the print output destination is known.

In addition, an image forming device that acquires a print setting associated with authenticated user information from a network print service system to perform printing has been proposed.

SUMMARY OF THE INVENTION

Meanwhile, various types of image forming devices such as a multifunction copier installed in a public area such as a convenience store are currently available, and the functions that can be used differ depending on the type.

Therefore, there has been a problem in that a function used in a multifunction copier of a certain store cannot be used in a multifunction copier of another store, and a print history and a print setting based on authenticated user information cannot be used between different types of multifunction copiers.

Moreover, even when printing is performed by the same type of multifunction copier, a user who stores print data and a user who performs printing may be different from each other. Therefore, there has been a problem in that it is difficult for the user who performs printing to grasp what kind of intention the user who stores print data has performed a print setting.

The present disclosure has been made in view of the above circumstances, and provides an image forming system capable of executing printing by network printing more easily and quickly than ever before.

An image forming system according to the present disclosure is an image forming system including: a server; a user terminal; and an image forming device, which are connected via a network, in which the server includes: a server storage that stores print data uploaded in advance in association with user authentication information; and a code issuer that issues a code including the user authentication information, the server transmits the code in response to a request from the user terminal, and, when the user authentication information is received from the image forming device, acquires the print data associated with the user authentication information from the server storage and transmits the print data to the image forming device, the user terminal includes: a terminal display that displays various types of information to a user, the user terminal, when the code is received from the server, displays the code on the terminal display, the image forming device includes: a code reader that reads the code to acquire the user authentication information included in the code; a display that displays various types of information to the user; an operation acceptor that accepts a command of the user; and an image former that forms an image on the basis of the print data received from the server, and the image forming device, when the code reader acquires the user authentication information, transmits the user authentication information to the server, when the print data associated with the user authentication information is received from the server, displays a print setting screen of the print data on the display, when the operation acceptor accepts a print setting from the user, displays, on the display, a print setting completion screen of the print data for which the print setting is reflected, and, when the operation acceptor accepts a print command of the print data, causes the image former to form an image based on the print data.

According to the present disclosure, a print setting screen is displayed only by causing the code reader of the image forming device to read a code, and thus the image forming system capable of executing printing by network printing more easily and quickly than ever before is realized.

BRIEF DESCRIPTION OF THE DRAWINGS

FIG. 14 is an example of a list of past print histories of a certain user in the image forming system according to the second embodiment of the present disclosure.

DETAILED DESCRIPTION OF THE INVENTION

Figure 1:
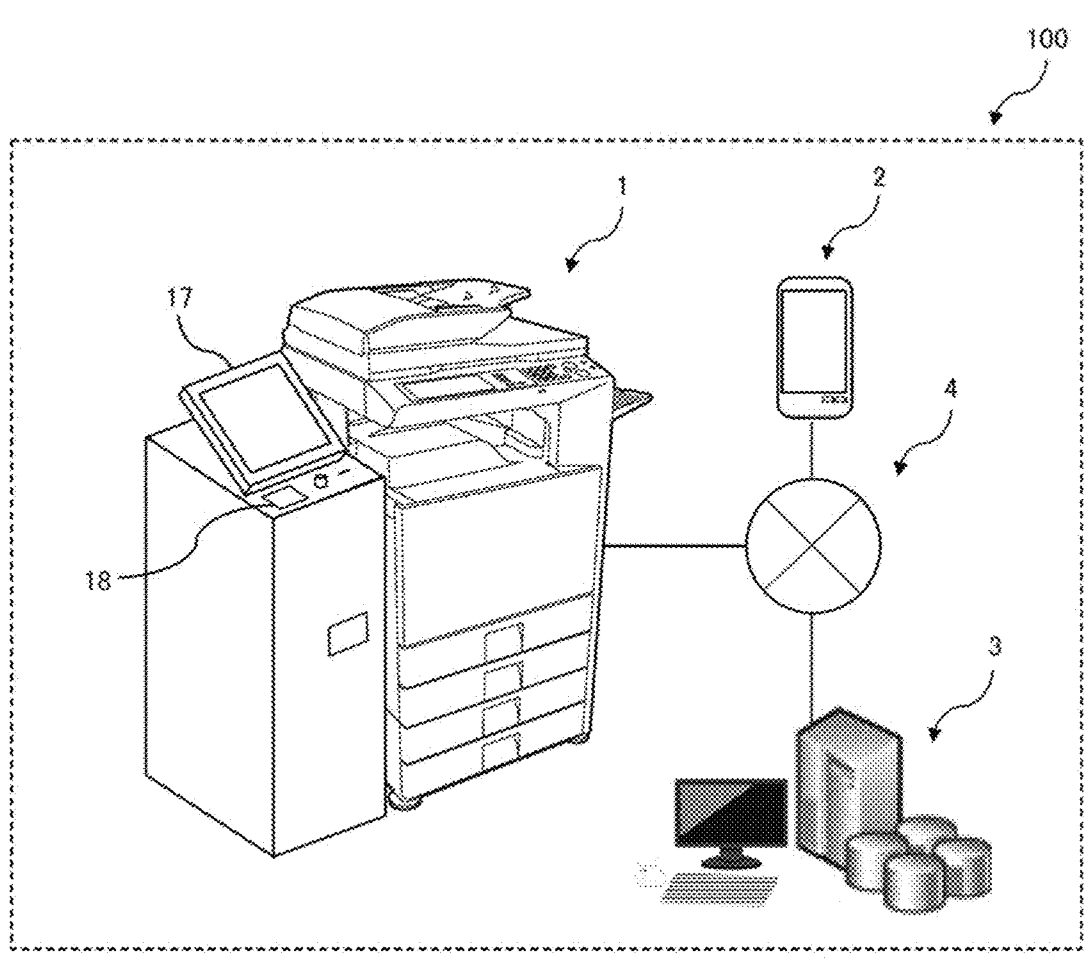
FIG. 1 is an explanatory diagram illustrating an example of an image forming system according to a first embodiment of the present disclosure.

In the present disclosure, an "image forming device" is a device that forms and outputs an image, such as a copier or a multifunction machine having a copy function, or an MFP having functions other than a copy function.

A "user terminal" is a mobile information terminal such as a smartphone or a tablet terminal. "Print data uploaded in advance" is not limited to print data uploaded from a user terminal, and may be print data uploaded from another terminal.

A "code" is, for example, a one-dimensional code such as a barcode or a two-dimensional code such as a QR code (registered trademark).

Furthermore, preferred aspects of the present disclosure will be described.

In the image forming system according to the present disclosure, the server storage, when a print setting is added to print data uploaded in advance, may store the print data and the print setting in association with user authentication information, the server, when the user authentication information is received from the image forming device, may acquire the print data and the print setting associated with the user authentication information from the server storage and transmit the print data and the print setting to the image forming device, and the image forming device, when the print data and the print setting are received from the server, may display a print setting completion screen of the print data for which the print setting is reflected on the display, and, when the operation acceptor accepts a print command from a user, may cause the image former to form an image based on the print data.

Accordingly, when print data for which a print setting has been made is uploaded to the server, the print setting is automatically added only by causing the code reader of the image forming device to read a code, and thus the image forming system capable of executing printing by network printing more easily and quickly than ever before can be realized.

In the image forming system according to the present disclosure, the server storage may store a print history for each piece of the user authentication information, and, when a print setting is not added to print data uploaded in advance, may store a print setting based on the print history associated with the print data together with the print data in association with the user authentication information, and the image forming device may cause the image former to form an image based on the print data, and then, transmit the print history of the print data to the server.

The "print history associated with the print data" is determined on the basis of a criterion determined in advance, for example, whether a file extension is the same, whether a print job was printed in the most recent (for example, in the past week) print timing, and whether the configuration of a file name is the same to some extent (for example, 50% or more).

Accordingly, when print data for which a print setting has not been made is uploaded to the server, a print setting based on a past print history is added, and thus the image forming system capable of executing printing by network printing more easily and quickly than ever before can be realized.

In the image forming system according to the present disclosure, the server storage may store multiple pieces of print data uploaded in advance in association with user authentication information, the server, when the user authentication information is received from the image forming device, may acquire the multiple pieces of print data associated with the user authentication information from the server storage and transmit the multiple pieces of print data to the image forming device, and the image forming device, when the multiple pieces of print data are received from the server, may display a list of the multiple pieces of print data on the display, and, when the operation acceptor accepts a selection of print data to be printed among the multiple pieces of print data, may display a print setting screen of the print data on the display.

Accordingly, even when multiple print files are printed, the image forming system capable of executing printing by network printing more easily and quickly than ever before can be realized only by causing the code reader of the image forming device to read a code.

In the image forming system according to the present disclosure, the server storage may store print data uploaded in advance in association with group authentication information in which multiple pieces of user authentication are grouped, the code issuer may issue a code including the group authentication information, the server, when the group authentication information is received from the image forming device, may acquire the print data associated with the group authentication information from the server storage and transmit the print data to the image forming device, and the image forming device, when the print data is received from the server, may display a shared folder associated in advance with the group authentication information on the display, and, when the operation acceptor accepts a selection of the shared folder, may display a print setting screen of the print data on the display.

Accordingly, the image forming system capable of executing printing by network printing more easily and quickly than ever before can be realized only by uploading print data to a shared folder of a group such as a company and causing the code reader of the image forming device to read a code.

Hereinafter, the present disclosure will be described in more detail with reference to the drawings. The following description is illustrative in all respects and should not be construed as limiting the present disclosure.

First Embodiment

An image forming system 100 configured by a digital multifunction machine 1, which is an embodiment of the image forming device of the present disclosure, will be described with reference to FIGS. 1 to 4.

FIG. 1 is an explanatory diagram illustrating an example of the image forming system 100 according to a first embodiment of the present disclosure.

As illustrated in FIG. 1, the image forming system 100 is configured by the digital multifunction machine 1, a user terminal 2, and a server 3, which are connected to each other via a network 4.

The digital multifunction machine 1 is a device such as a multifunction machine or an MFP that digitally processes image data and has a copy function, a printer function, a scanner function, and a facsimile function.

The user terminal 2 is a mobile terminal such as a smartphone.

The user terminal 2 transmits print data to the server 3 to receive a QR code, and causes the digital multifunction machine 1 to read the QR code, acquire the print data from the server 3, and execute a print job, via the network 4.

The server 3 is a device that stores print data necessary for network printing and issues a QR code associated with the print data.

Moreover, the server 3 may be a cloud server configured on cloud.

The network 4 is a network such as a wide area network (WAN) that connects the digital multifunction machine 1, the user terminal 2, and the server 3 to each other, and may be wired or wireless.

Figure 2:
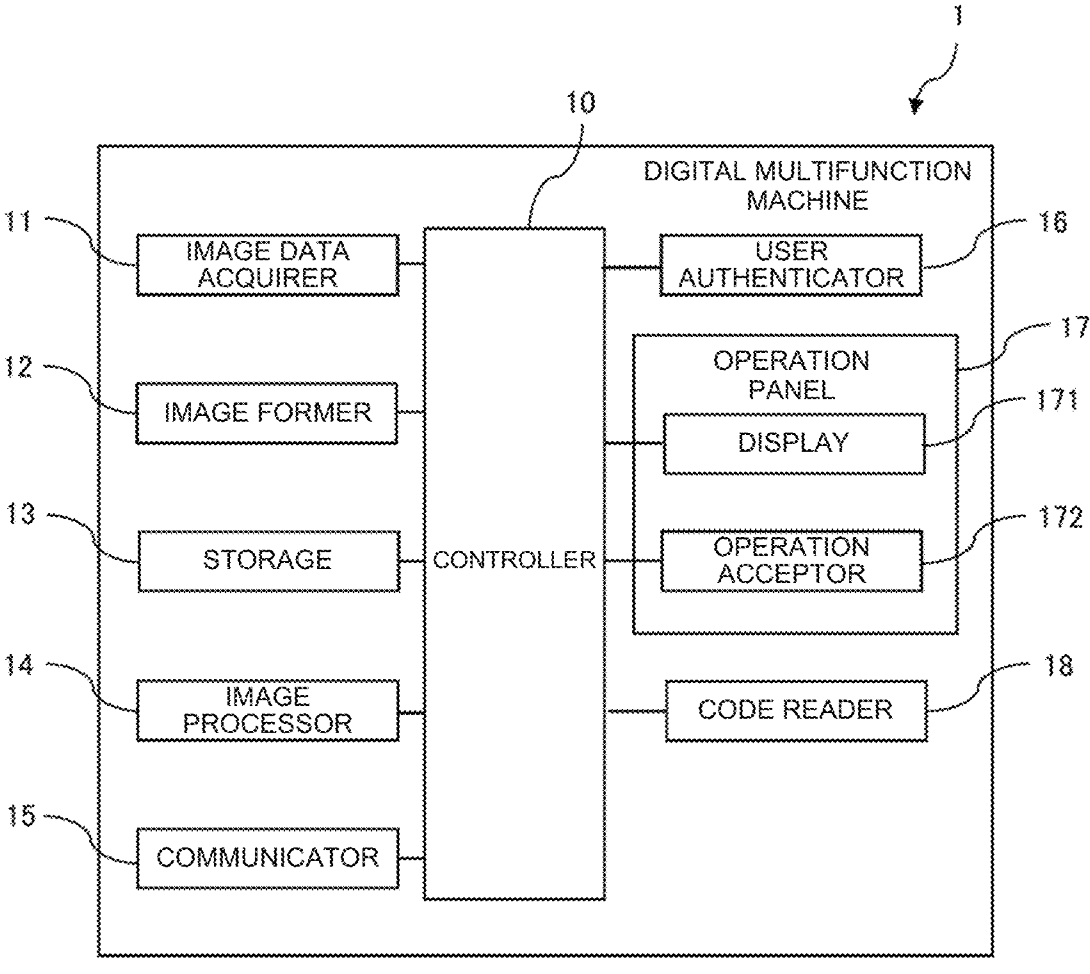
FIG. 2 is a block diagram illustrating a schematic configuration of a digital multifunction machine of FIG. 1.

FIG. 2 is a block diagram illustrating a schematic configuration of the digital multifunction machine 1 of FIG. 1.

As illustrated in FIG. 2, the digital multifunction machine 1 includes a controller 10, an image data acquirer 11, an image former 12, a storage 13, an image processor 14, a communicator 15, a user authenticator 16, an operation panel 17, and a code reader 18.

Hereinafter, each component of the digital multifunction machine 1 will be described.

The controller 10 integrally controls the digital multifunction machine 1, and is composed of a central processing unit (CPU), a random access memory (RAM), a read only memory (ROM), various interface circuits, or the like.

In order to control the action of the entire digital multifunction machine 1, the controller 10 performs detection of each sensor, and monitoring and control of all loads such as a motor, a clutch, and the operation panel 17.

The image data acquirer 11 is a part that acquires image data from an external server or the like via the network 4.

The image former 12 is a part that prints out, on a sheet of paper, image data acquired by the image data acquirer 11 and processed by the image processor 14.

The storage 13 is an element or a storage medium that stores information required to realize various functions of the digital multifunction machine 1, a control program, and the like. For example, a semiconductor element such as a RAM or a ROM, or a storage medium such as a hard disk, a flash storage, or a solid state drive (SSD) is used.

The storage 13 stores data required for execution of a job, such as information on a job of printing or the like and image data.

The storage 13 also stores information, such as a login name and a password of a user, stored for user authentication.

A program and data may be held in different devices such that a region for holding the data is configured by a hard disk drive and a region for holding the program is configured by a flash storage.

The image processor 14 is a part that executes processing suitable for output such as enlargement and reduction by converting image data entered from the image data acquirer 11 into an appropriate electric signal, on the basis of an analysis result of a command of a job of printing or the like acquired through the operation acceptor 172 or the server 3.

The communicator 15 is a part that communicates with the external server 3 or the like via the network, and transmits and receives various types of information such as print data and a job history.

The user authenticator 16 is a part that authenticates whether the user is a registered user by comparing information such as a login name and a password entered from the operation acceptor 172 with corresponding information acquired from the storage 13 or the server 3.

The operation panel 17 is configured by a display panel configured by a liquid crystal panel or the like, and a touch panel arranged to overlap with the display panel and employing a capacitive method or the like to detect a position touched by a finger. The operation panel 17 includes a display 171 and the operation acceptor 172.

The display 171 is a part that displays various types of information.

The display 171 is configured by, for example, a CRT display, a liquid crystal display, or an EL display, and is a display device such as a monitor or a line display for an operating system or application software to display electronic data such as a processing state.

The controller 10 displays the action and the state of the digital multifunction machine 1 via the display 171.

The operation acceptor 172 is an interface for operating the digital multifunction machine 1, and is a part that accepts a command from a user.

The code reader 18 is a part that acquires a code of a network print service, such as a QR code, displayed on a display 251 of the user terminal 2.

<Schematic Configuration of User Terminal 2>

Figure 3:
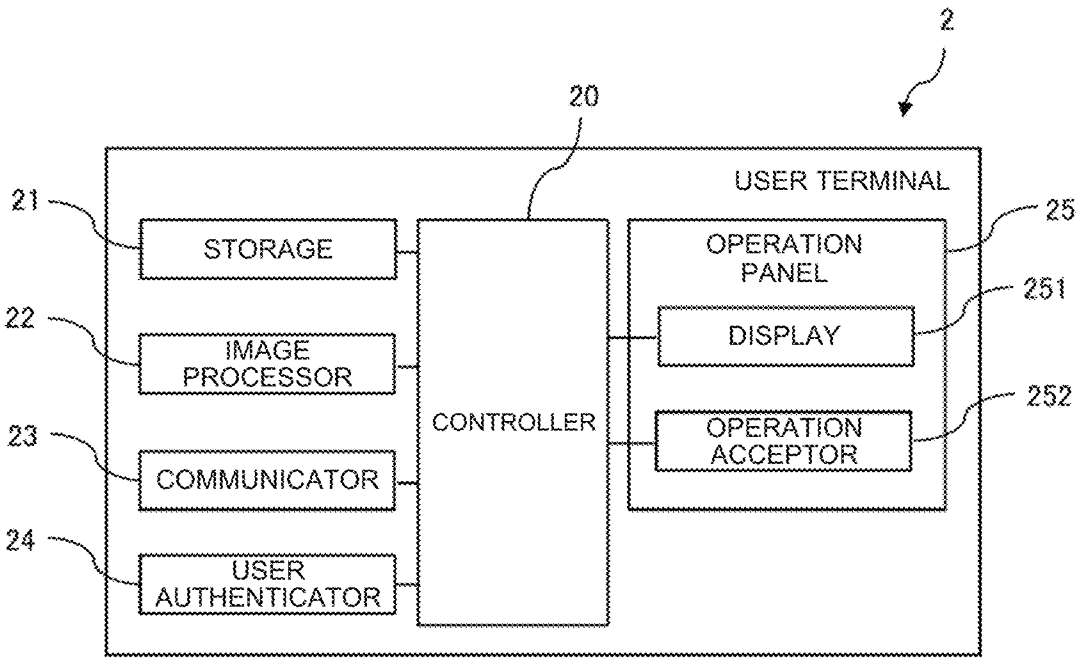
FIG. 3 is a block diagram illustrating a schematic configuration of a user terminal of FIG. 1.

FIG. 3 is a block diagram illustrating a schematic configuration of the user terminal 2 of FIG. 1.

As illustrated in FIG. 3, the user terminal 2 includes a controller 20, a storage 21, an image processor 22, a communicator 23, a user authenticator 24, and an operation panel 25.

The controller 20 integrally controls the user terminal 2, and is composed of a CPU, a RAM, a ROM, various interface circuits, or the like.

The storage 21 is an element or a storage medium that stores information required to realize various functions of the user terminal 2, a control program, and the like. For example, a semiconductor element such as a RAM or a ROM, or a storage medium such as a hard disk, a flash storage, or an SSD is used.

The image processor 22 is a part that executes processing suitable for output such as enlargement and reduction of an image to be displayed on the display 251, on the basis of a command of an operation acceptor 252.

The communicator 23 is a part that communicates with the digital multifunction machine 1, the server 3, or the like via the network, and transmits and receives various types of data such as print data and a QR code.

The user authenticator 24 is a part that authenticates whether the user is a registered user by comparing information such as a login name and a password entered from the operation acceptor 252 with corresponding information recorded in advance in the storage 21.

The operation panel 25 is configured by a display panel configured by a liquid crystal panel or the like, and a touch panel arranged to overlap with the display panel and employing a capacitive method or the like to detect a position touched by a finger. The operation panel 25 includes the display 251 and the operation acceptor 252.

The display 251 is a part that displays various types of information.

The display 251 is configured by, for example, a CRT display, a liquid crystal display, or an EL display, and is a display device such as a monitor or a line display for an operating system or application software to display electronic data such as a processing state.

The controller 20 displays the action and the state of the user terminal 2 via the display 251.

The operation acceptor 252 is an interface for operating the user terminal 2, and is a part that accepts a command from a user.

<Schematic Configuration of Server 3>

Figure 4:
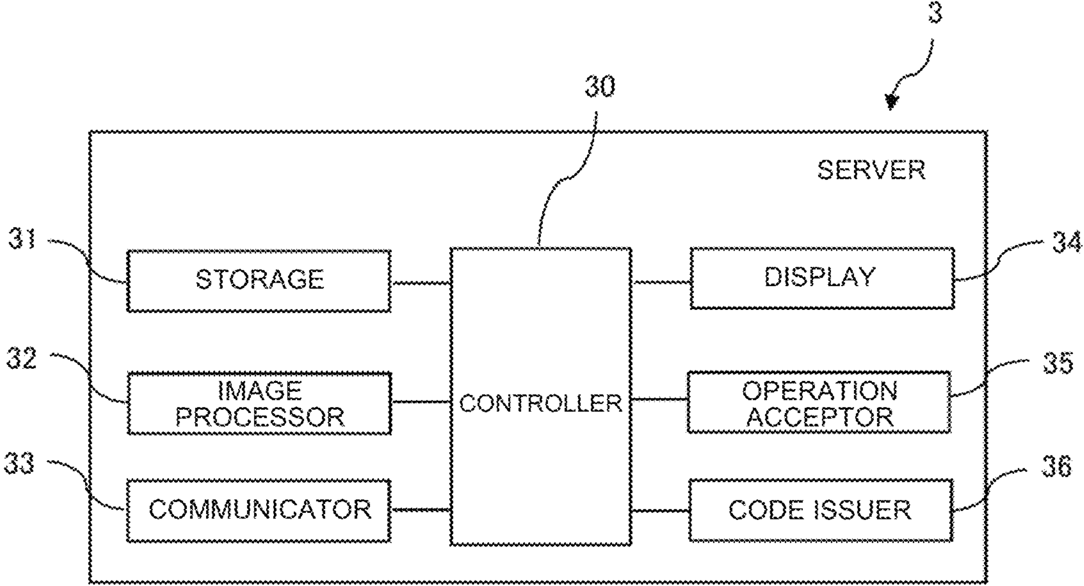
FIG. 4 is a block diagram illustrating a schematic configuration of a server of FIG. 1.

Next, a schematic configuration of the server 3 will be described with reference to FIG. 4. FIG. 4 is a block diagram illustrating the schematic configuration of the server 3 of FIG. 1.

As illustrated in FIG. 4, the server 3 includes a controller 30, a storage 31, an image processor 32, a communicator 33, a display 34, an operation acceptor 35, and a code issuer 36.

Hereinafter, each component of the server 3 will be described.

The controller 30 integrally controls the server 3, and is composed of a CPU, a RAM, a ROM, various interface circuits, or the like.

The storage 31 is an element or a storage medium that stores information required to realize various functions of the server 3, a control program, and the like. For example, a semiconductor element such as a RAM or a ROM, or a storage medium such as a hard disk, a flash storage, or an SSD is used.

The storage 31 stores print data for network printing received from the user terminal 2.

The image processor 32 is a part that executes processing suitable for output such as enlargement and reduction of an image to be displayed on the display 34, on the basis of a command of the operation acceptor 35.

The communicator 33 is a part that communicates with the digital multifunction machine 1, the user terminal 2, or the like via the network, and transmits and receives various types of data such as print data and a QR code.

The display 34 is a part that has a display panel configured by a liquid crystal panel or the like and displays various types of information.

The display 34 is configured by, for example, a CRT display, a liquid crystal display, or an EL display, and is a display device such as a monitor or a line display for an operating system or application software to display electronic data such as a processing state.

The controller 30 displays the action and the state of the server 3 via the display 34.

The operation acceptor 35 is an interface for operating the server 3, and is a part that accepts a command from an administrative user of the server 3.

<Example of Registration of Print Data to Server 3 and Transmission Processing to Digital Multifunction Machine 1 of First Embodiment of Present Disclosure>

Next, an example of registration of print data to the server 3, issuance and transmission of a user number and a QR code by the server 3, and transmission processing to the digital multifunction machine 1 of the first embodiment of the present disclosure will be described with reference to FIG. 5.

Figure 5:
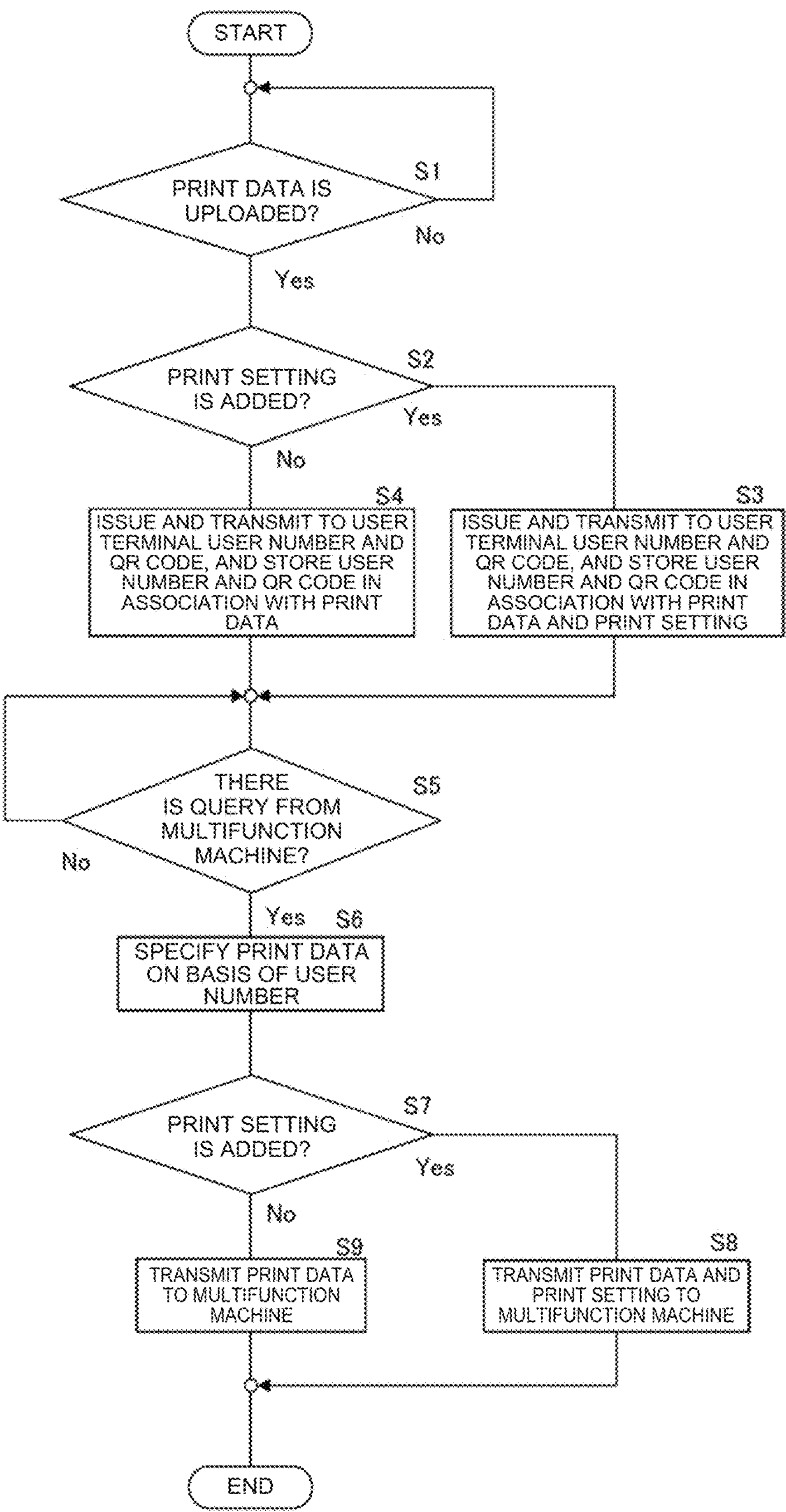
FIG. 5 is a flowchart illustrating a flow of registration of print data to the server from the user terminal of FIG. 1, issuance and transmission of a user number and a QR code (registered trademark) by the server, and transmission processing of the print data to the digital multifunction machine.

FIG. 5 is a flowchart illustrating a flow of registration of print data to the server from the user terminal of FIG. 1, issuance and transmission of a QR code, and transmission processing of the print data to the digital multifunction machine.

In step S1 of FIG. 5, the server 3 determines whether print data for network printing is uploaded from the user terminal 2 (step S1).

The user terminal 2 that uploads print data and the user terminal 2 that causes the digital multifunction machine 1 to read a QR code do not need to be the same.

For example, print data may be uploaded from a personal computer of a user to the server 3, and a QR code issued for the print data may be acquired by a mobile terminal of the user and read by the digital multifunction machine 1.

When print data is uploaded (when the determination in step S1 is Yes), in step S2, the controller 30 of the server 3 determines whether a print setting is added to the print data (step S2).

When a print setting is added to the print data (when the determination in step S2 is Yes), in step S3, the controller 30 issues a user number and causes the code issuer 36 to issue a QR code for the print data, and stores in the storage 31 the user number and the QR code in association with the print data and the print setting (step S3).

In contrast, when a print setting is not added to the print data (when the determination in step S2 is No), in step S4, the controller 30 issues a user number and causes the code issuer 36 to issue a QR code for the print data, and stores in the storage 31 the user number and the QR code in association with the print data (step S4).

Thereafter, in step S5, the controller 30 determines whether there is a query from the digital multifunction machine 1 (step S5).

When there is a query from the digital multifunction machine 1 (when the determination in step S5 is Yes), in step S6, the controller 30 specifies print data on the basis of a user number acquired from the digital multifunction machine 1 (step S6).

In subsequent step S7, the controller 30 determines whether a print setting is added to the print data (step S7).

When a print setting is added to the print data (when the determination in step S7 is Yes), in step S8, the controller 30 transmits the print data and the print setting to the digital multifunction machine 1 (step S8), and ends the processing.

In contrast, when a print setting is not added to the print data (when the determination in step S7 is No), in step S9, the controller 30 transmits the print data to the digital multifunction machine 1 (step S9), and ends the processing.

<Example of Print Processing Using QR Code in Digital Multifunction Machine 1 of First Embodiment of Present Disclosure>

Next, an example of print processing using a QR code in the digital multifunction machine 1 of the first embodiment of the present disclosure will be described with reference to FIGS. 6 to 12.

Figure 6:
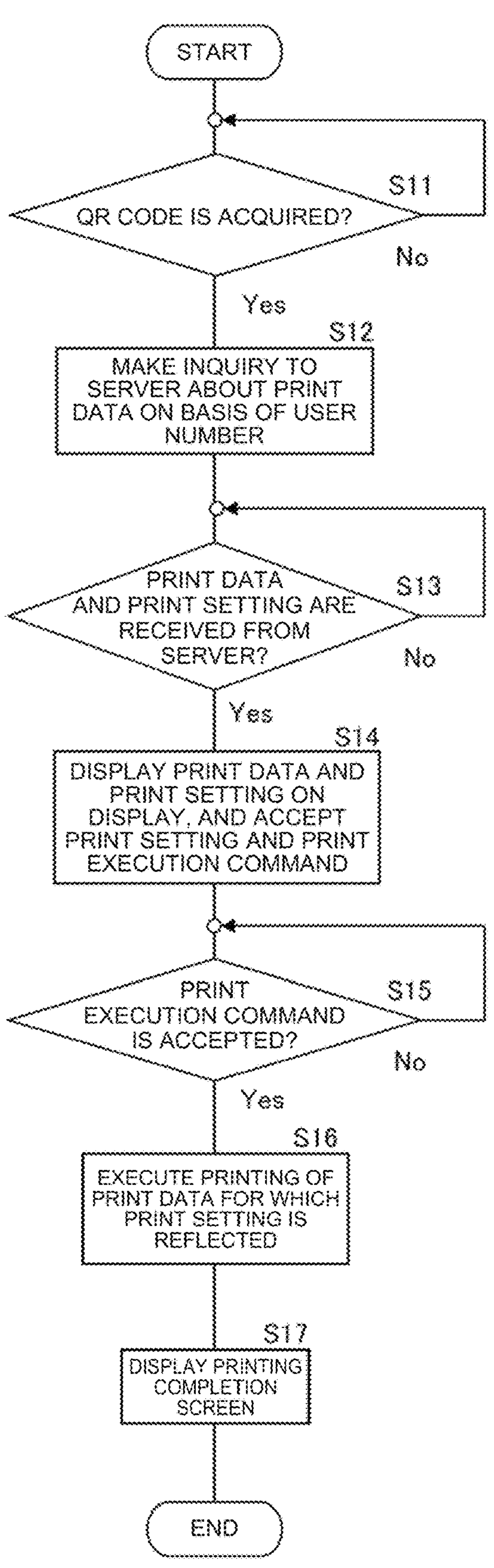
FIG. 6 is a flowchart illustrating a flow of print processing using a QR code in the image forming system of FIG. 1.

FIG. 6 is a flowchart illustrating a flow of print processing using a QR code in the image forming system 100 of FIG. 1.

In step S11 of FIG. 6, the controller 10 of the digital multifunction machine 1 determines whether the code reader 18 acquires a QR code (step S11).

Figure 7:
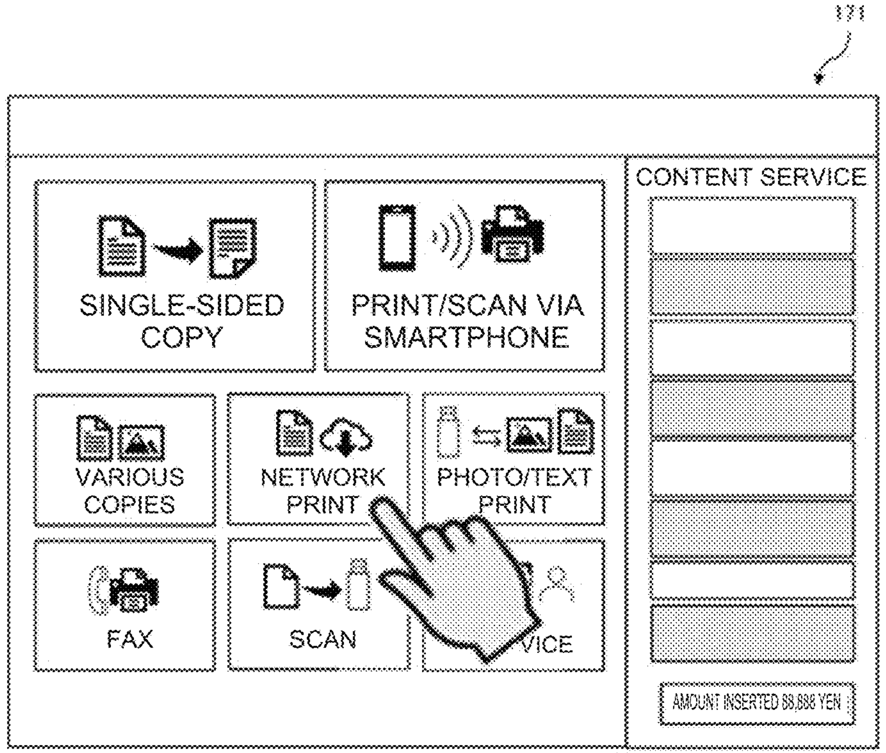
FIG. 7 is an example of an initial screen displayed on a display of the digital multifunction machine of FIG. 1.

FIG. 7 is an example of an initial screen displayed on the display 171 of the digital multifunction machine 1 of FIG. 1.

When performing printing by network printing, a user selects a "network print" button as illustrated in FIG. 7.

Figure 8:
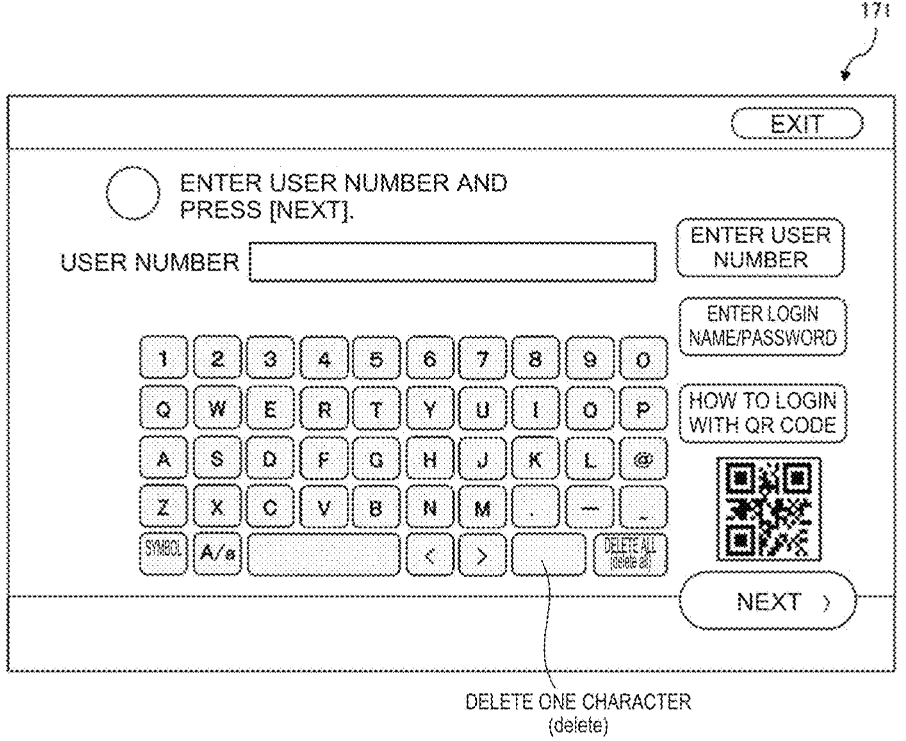
FIG. 8 is an example of a user number entry screen for network printing displayed on the display of the digital multifunction machine of FIG. 1.

FIG. 8 is an example of a user number entry screen for network printing displayed on the display 171 of the digital multifunction machine 1 of FIG. 1.

When the "network print" button is selected on the initial screen of FIG. 7, the user number entry screen illustrated in FIG. 8 is displayed on the display 171.

In a conventional method, a user enters a user number issued by the server 3 into a predetermined entry form illustrated in FIG. 8.

In contrast, in the first embodiment of the present disclosure, instead of entering the user number, a QR code issued by the server 3 is read by the digital multifunction machine 1.

Figure 9:
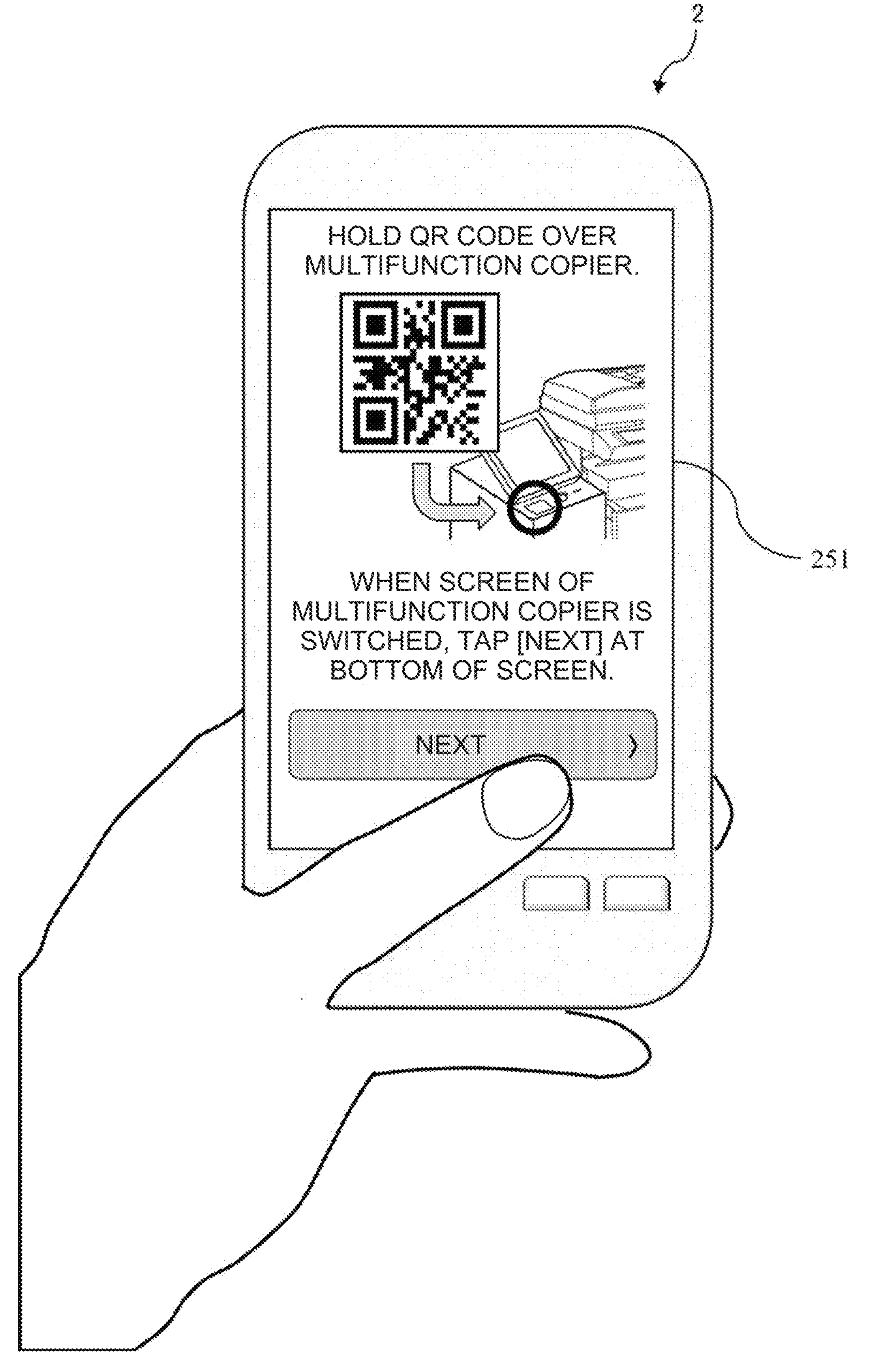
FIG. 9 is an example of a QR code displayed on a display of the user terminal of FIG. 1.

FIG. 9 is an example of a QR code displayed on the display 251 of the user terminal 2 of FIG. 1.

In the example of FIG. 9, together with a message "Hold QR code over multifunction copier," a QR code is displayed on the display 251.

The user holds the QR code over the code reader 18 as instructed to cause the code reader 18 to read the QR code.

When the code reader 18 acquires a QR code in step S11 of FIG. 6 (when the determination in step S11 is Yes), in step S12, the controller 10 makes an inquiry to the server 3 about print data on the basis of a user number acquired from the QR code (step S12).

Next, in step S13, the controller 10 determines whether print data and a print setting are received from the server 3 (step S13).

When print data and a print setting are received from the server 3 (when the determination in step S13 is Yes), in step S14, the controller 10 displays the print data and the print setting on the display 171, and accepts a print setting and a print execution command (step S14).

Specifically, when the print data and the print setting are received from the server 3, the controller 10 displays, on the display 171, a print setting completion screen for which the print setting is reflected, and accepts a setting change and a print execution command.

Figure 10:
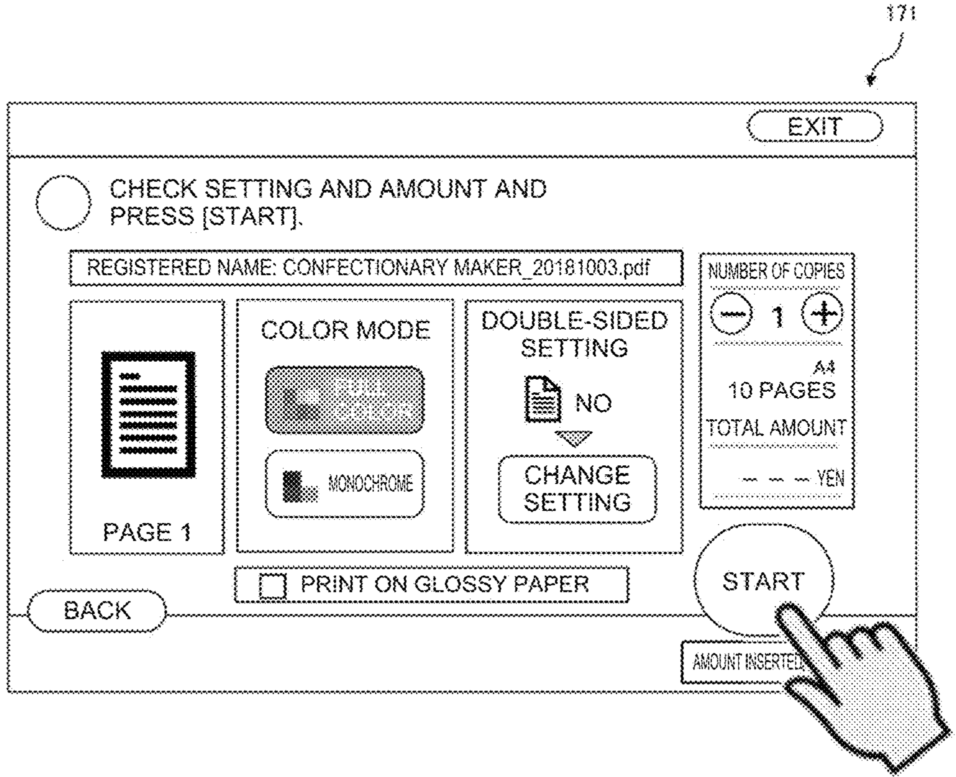
FIG. 10 is an example of a print setting completion screen for network printing displayed on the display of the digital multifunction machine of FIG. 1.

FIG. 10 is an example of the print setting completion screen for network printing displayed on the display 171 of the digital multifunction machine 1 of FIG. 1.

In the example of FIG. 10, the print data "confectionary maker_20181003.pdf" and the print setting such as "full color," "no double-sided setting," and "one copy" is displayed on the display 171.

In this screen, the user may perform a setting change.

Meanwhile, when there is no problem in the setting, the user presses a lower right "start" button to execute printing.

In contrast, when only the print data is received from the server 3 without the print setting, the controller 10 displays a print setting screen of the print data on the display 171, and accepts a setting command.

Figure 11:
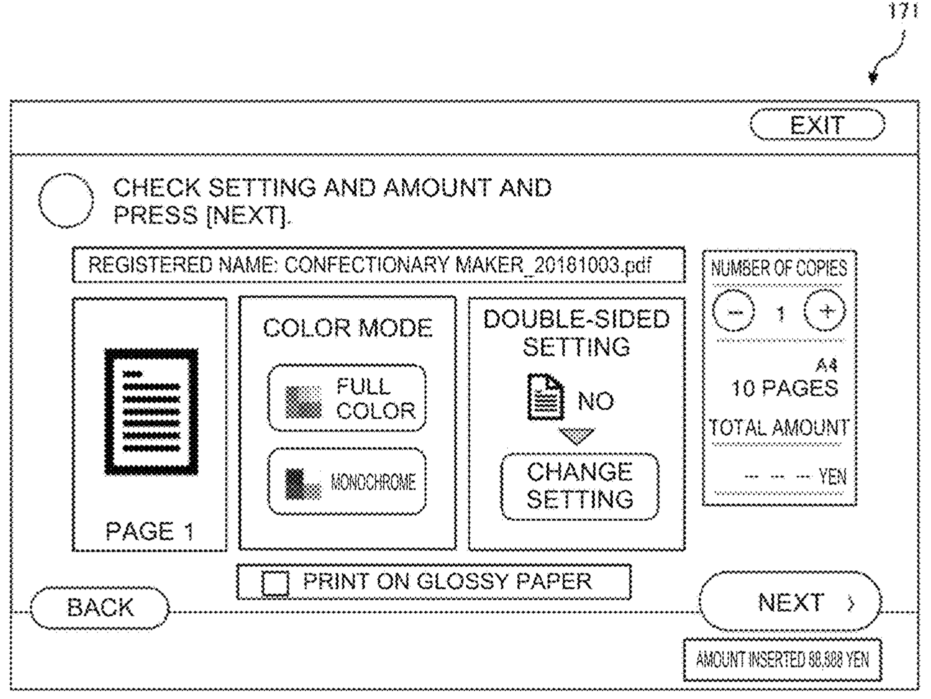
FIG. 11 is an example of a print setting screen for network printing displayed on the display of the digital multifunction machine of FIG. 1.

FIG. 11 is an example of the print setting screen for network printing displayed on the display 171 of the digital multifunction machine 1 of FIG. 1.

In this screen, when the user presses a "next" button after performing the print setting, the screen transitions to the print setting completion screen of FIG. 10.

Next, in step S15 of FIG. 6, the controller 10 determines whether a print execution command is accepted (step S15).

When a print execution command is accepted (when the determination in step S15 is Yes), in step S16, the controller 10 causes the image former 12 to execute printing of the print data for which the print setting is reflected (step S16).

When the printing is completed, in subsequent step S17, the controller 10 displays a printing completion screen on the display 171 (step S17), and ends the processing.

Figure 12:
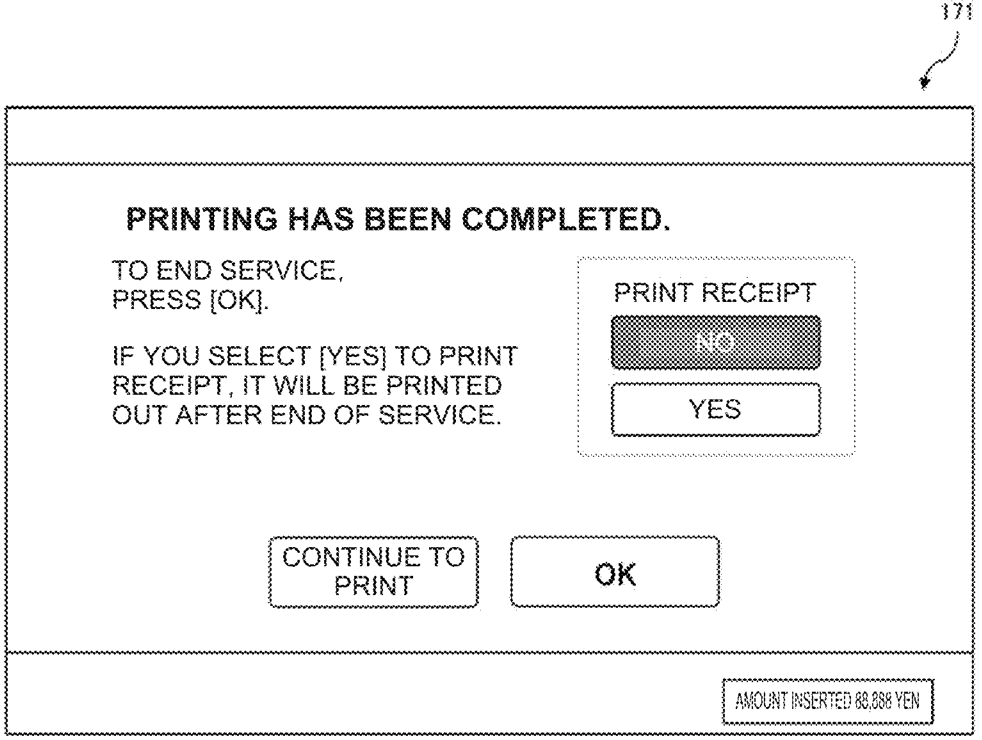
FIG. 12 is an example of a printing completion screen for network printing displayed on the display of the digital multifunction machine of FIG. 1.

FIG. 12 is an example of the printing completion screen for network printing displayed on the display 171 of the digital multifunction machine 1 of FIG. 1.

In this manner, the digital multifunction machine 1 capable of executing printing by network printing more easily and quickly than ever before can be realized only by reading a QR code.

Second Embodiment

Next, another example of registration of print data to the server 3 and transmission processing to the digital multifunction machine 1 in the image forming system 100 of a second embodiment of the present disclosure will be described with reference to FIGS. 13 to 15.

The first embodiment is characterized in that, when print data for which a print setting has not been made is uploaded, the print data is transmitted to the digital multifunction machine 1 as it is, and a user makes a print setting.

In contrast, the second embodiment is characterized in that, when print data for which a print setting has not been made is uploaded, if there is past print history data associated with the print data, a print setting based on the past print history is added to the print data, and the print data is transmitted to the digital multifunction machine 1.

The schematic configuration of the image forming system 100 according to the second embodiment is similar to that in FIGS. 1 to 4 (the first embodiment), and thus the description thereof will be omitted.

Figure 13:
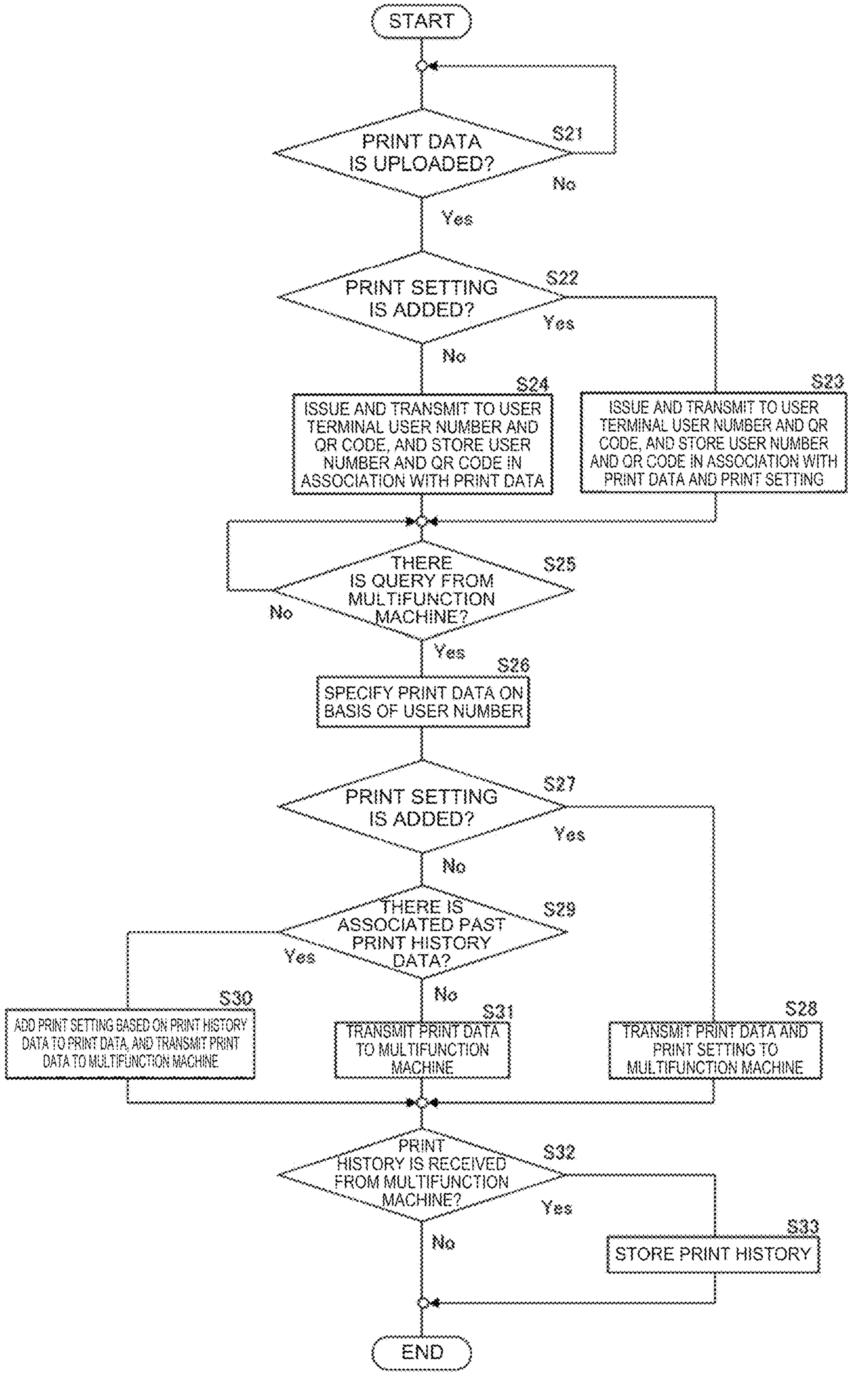
FIG. 13 is a flowchart illustrating a flow of registration of print data to the server from the user terminal, issuance and transmission of a user number and a QR code by the server, and transmission processing of the print data to the digital multifunction machine in the image forming system according to a second embodiment of the present disclosure.

FIG. 13 is a flowchart illustrating a flow of registration of print data to the server 3 from the user terminal 2, issuance and transmission of a user number and a QR code by the server 3, and transmission processing of the print data to the digital multifunction machine 1 in the image forming system 100 according to the second embodiment of the present disclosure.

Processing in steps S21 to S28 of FIG. 13 corresponds to the processing in steps S1 to S8 of FIG. 5 (the first embodiment), respectively, and thus the description thereof will be omitted. Processing in steps S29 to S33 of FIG. 13, which is not illustrated in FIG. 5, will be described here.

In step S27 of FIG. 13, when a print setting is not added to the print data (when the determination in step S27 is No), in step S29, the controller 30 of the server 3 determines whether there is past print history data associated with the print data (step S29).

FIG. 14 is an example of a list of past print histories of a certain user in the image forming system 100 according to the second embodiment of the present disclosure.

In the example of FIG. 14, a history of "file extension," "print timing," "file name," and "print setting" is stored in the storage 31.

Examples of the "file extension" include "docx," "xlsx," and "pptx."

Examples of the "print setting" include "color/monochrome," "paper size," "double-sided/single-sided," and "number of prints."

Whether the past print history is associated with the uploaded print data is determined on the basis of a criterion, for example, whether the file extension is the same, whether the print job was printed in the most recent (for example, in the past week) print timing, and whether the configuration of the file name is the same to some extent (for example, 50% or more).

When there is an associated print history, the print setting thereof is added to the uploaded print data.

When there are multiple associated print histories and the print settings thereof are different, the most recent print setting is added.

Moreover, in the associated print histories, when eight of ten print histories are "monochrome" and the remaining two print histories are "color," a print setting having a higher usage frequency may be added, for example, a setting of "monochrome" may be added.

In step S29 of FIG. 13, when there is past print history data associated with the uploaded print data (when the determination in step S29 is Yes), in step S30, the controller 30 adds the print setting based on the print history data to the print data and transmits the print data to the digital multifunction machine 1.

Example 1

For example, when the user uploads print data with the extension "docx" and the file name "00 Specification Ver. 3" without a print setting on Apr. 7, 2022, print history data with the extension "docx" and the file name "○○ Specification Ver. 2" on Apr. 1, 2022 is found (the second line in FIG. 14) among print histories in the past week of the user.

The print setting "color, A4 paper, double-sided, 5 copies" of the print history data is added to the uploaded print data, and the print data is transmitted to the digital multifunction machine 1.

In contrast, in step S29, when there is not past print history data associated with the uploaded print data (when the determination in step S29 is No), in step S31, the controller 30 transmits the print data to the digital multifunction machine 1.

Example 2

For example, when the user uploads print data with the extension "jpeg" and the file name "market photo" without a print setting on Apr. 7, 2022, since print history data with the same file extension "jpeg" does not exist in the print histories in the past week of the user, the print data is transmitted to the digital multifunction machine 1 to cause the user to make a setting.

After the processing in step S28, S30, or S31 is completed, in step S32, the controller 30 determines whether a print history is received from the digital multifunction machine 1 (step S32).

When a print history is received from the digital multifunction machine 1 (when the determination in step S32 is Yes), in step S33, the controller 30 stores the print history in the storage 31 (step S33), and ends the processing.

In contrast, when a print history is not received from the digital multifunction machine 1 (when the determination in step S32 is No), the controller 30 ends the processing as it is.

Figure 15:
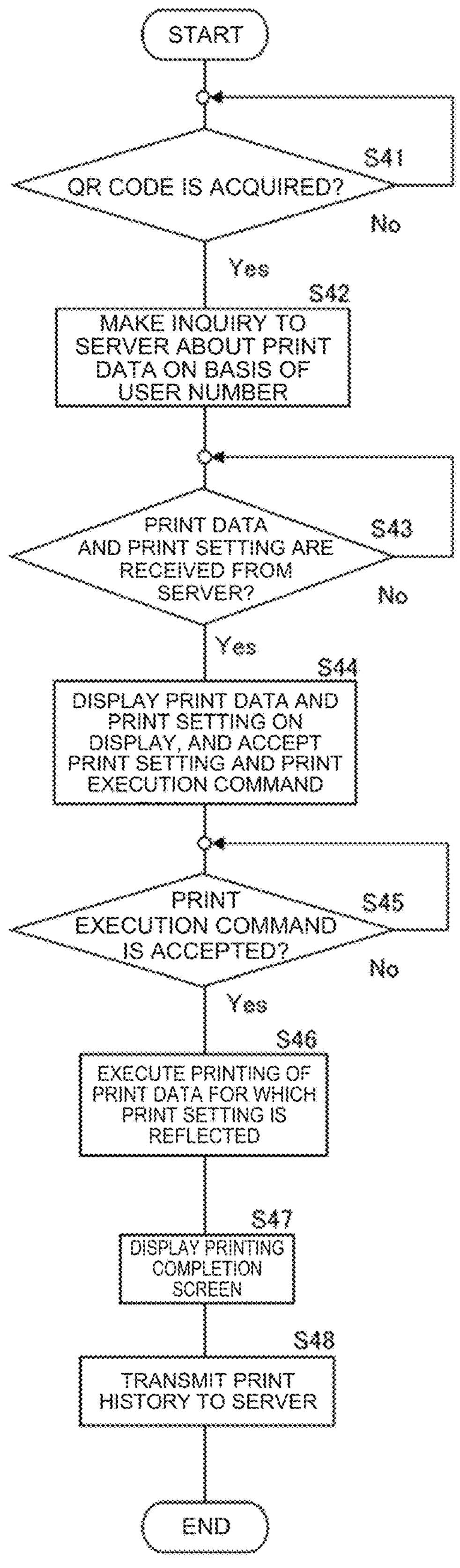
FIG. 15 is a flowchart illustrating a flow of print processing using a QR code in the image forming system according to the second embodiment of the present disclosure.

FIG. 15 is a flowchart illustrating a flow of print processing using a QR code in the image forming system 100 according to the second embodiment of the present disclosure.

Processing in steps S41 to S47 of FIG. 15 corresponds to the processing in steps S11 to S17 of FIG. 6 (the first embodiment), respectively, and thus the description thereof will be omitted. Processing in step S48 of FIG. 15, which is not illustrated in FIG. 6, will be described here.

In step S47 of FIG. 15, after the printing completion screen is displayed on the display 171 (step S47), in step S48, the controller 10 of the digital multifunction machine 1 transmits the print history to the server 3 (step S48), and ends the processing.

In this manner, when print data for which a print setting has not been made is uploaded, a print setting based on a past print history is added, and thus the digital multifunction machine 1 capable of executing printing by network printing more easily and quickly than ever before can be realized.

Third Embodiment

Next, another example of print processing using a QR code in the digital multifunction machine 1 in the image forming system 100 of a third embodiment of the present disclosure will be described with reference to FIGS. 16 and 17.

In the third embodiment, it is assumed that a user uploads multiple pieces of print data to the server 3.

The schematic configuration of the image forming system 100 according to the third embodiment is similar to that in FIGS. 1 to 4 (the first embodiment), and thus the description thereof will be omitted.

Figure 16:
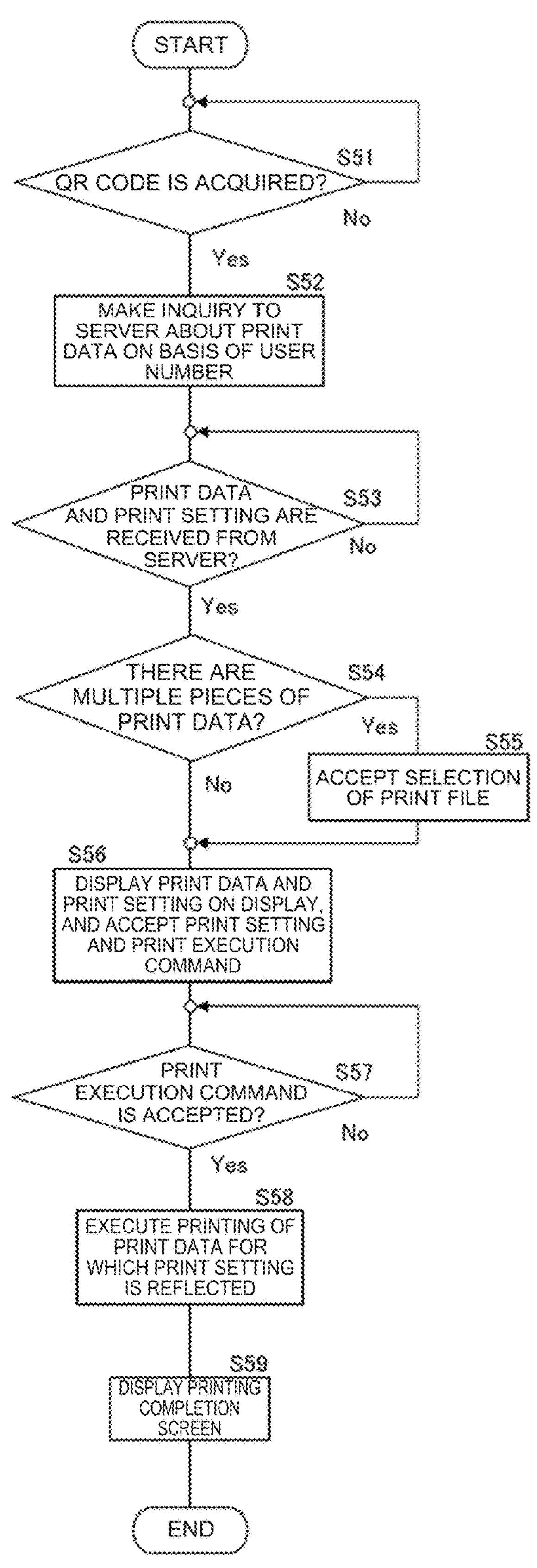
FIG. 16 is a flowchart illustrating a flow of print processing using a QR code in the image forming system according to a third embodiment of the present disclosure.

FIG. 16 is a flowchart illustrating a flow of print processing using a QR code in the image forming system 100 according to the third embodiment of the present disclosure.

Processing in steps S51 to S53 and S56 to S59 of FIG. 16 corresponds to the processing in steps S11 to S17 of FIG. 6 (the first embodiment), respectively, and thus the description thereof will be omitted.

Processing in steps S54 and S55 of FIG. 16, which is not illustrated in FIG. 6, will be described here.

In step S53 of FIG. 16, when print data and a print setting are received from the server 3 (when the determination in step S53 is Yes), in step S54, the controller 10 determines whether there are multiple pieces of print data (step S54).

When there are multiple pieces of print data (when the determination in step S54 is YES), in step S55, the controller 10 accepts a selection of a print file (step S55).

Figure 17:
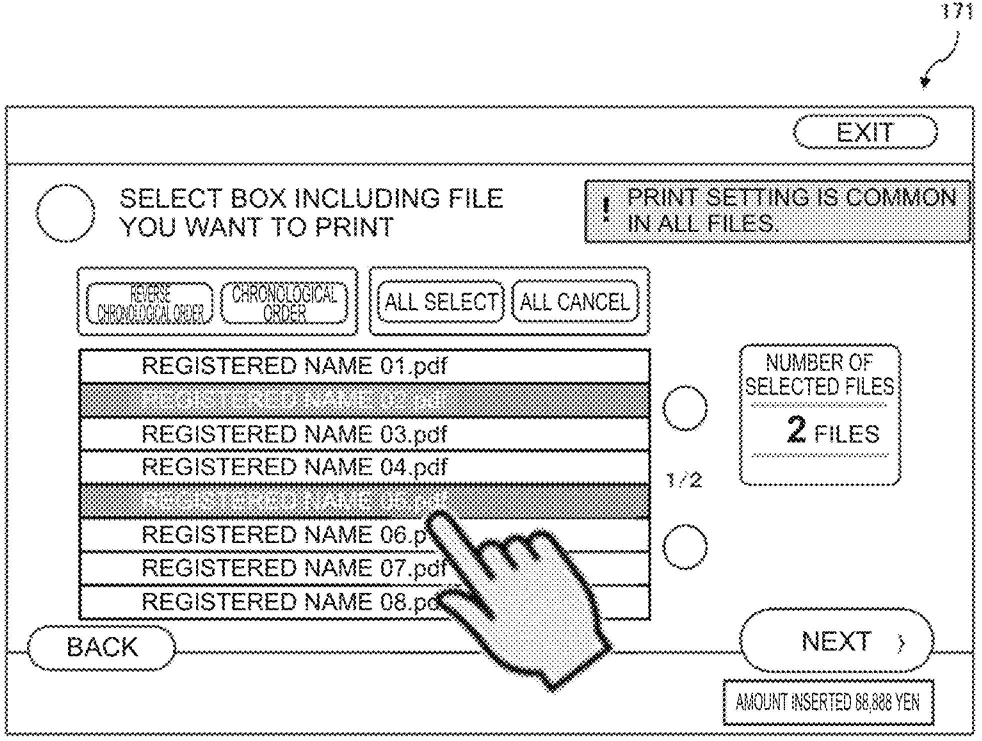
FIG. 17 is an example of a selection screen when there are multiple print files in the image forming system according to the third embodiment of the present disclosure.

FIG. 17 is an example of a selection screen when there are multiple print files in the image forming system 100 according to the third embodiment of the present disclosure.

In the example of FIG. 17, two print files of "registered name 02.pdf" and "registered name 05.pdf" are selected.

When the user presses a "next" button after selecting the print files, the screen transitions to a print setting completion screen.

In this case, the print setting is common in all files.

In contrast, in step S54, when there is only one piece of print data (when the determination in step S54 is No), in step S56, the controller 10 displays the print data and the print setting on the display 171, and accepts a print setting and a print execution command (step S56).

In this manner, even when multiple print files are printed, the digital multifunction machine 1 capable of executing printing by network printing more easily and quickly than ever before can be realized only by reading a QR code.

Fourth Embodiment

Next, another example of print processing using a QR code in the digital multifunction machine 1 in the image forming system 100 of a fourth embodiment of the present disclosure will be described with reference to FIGS. 18 to 20.

In the first to third embodiments, it is assumed that an individual user uploads print data to the server 3.

In contrast, in the fourth embodiment, it is assumed that a file registerer of a company uploads print data to a shared folder of the server 3.

The schematic configuration of the image forming system 100 according to the fourth embodiment is similar to that in FIGS. 1 to 4 (the first embodiment), and thus the description thereof will be omitted.

Figure 18:
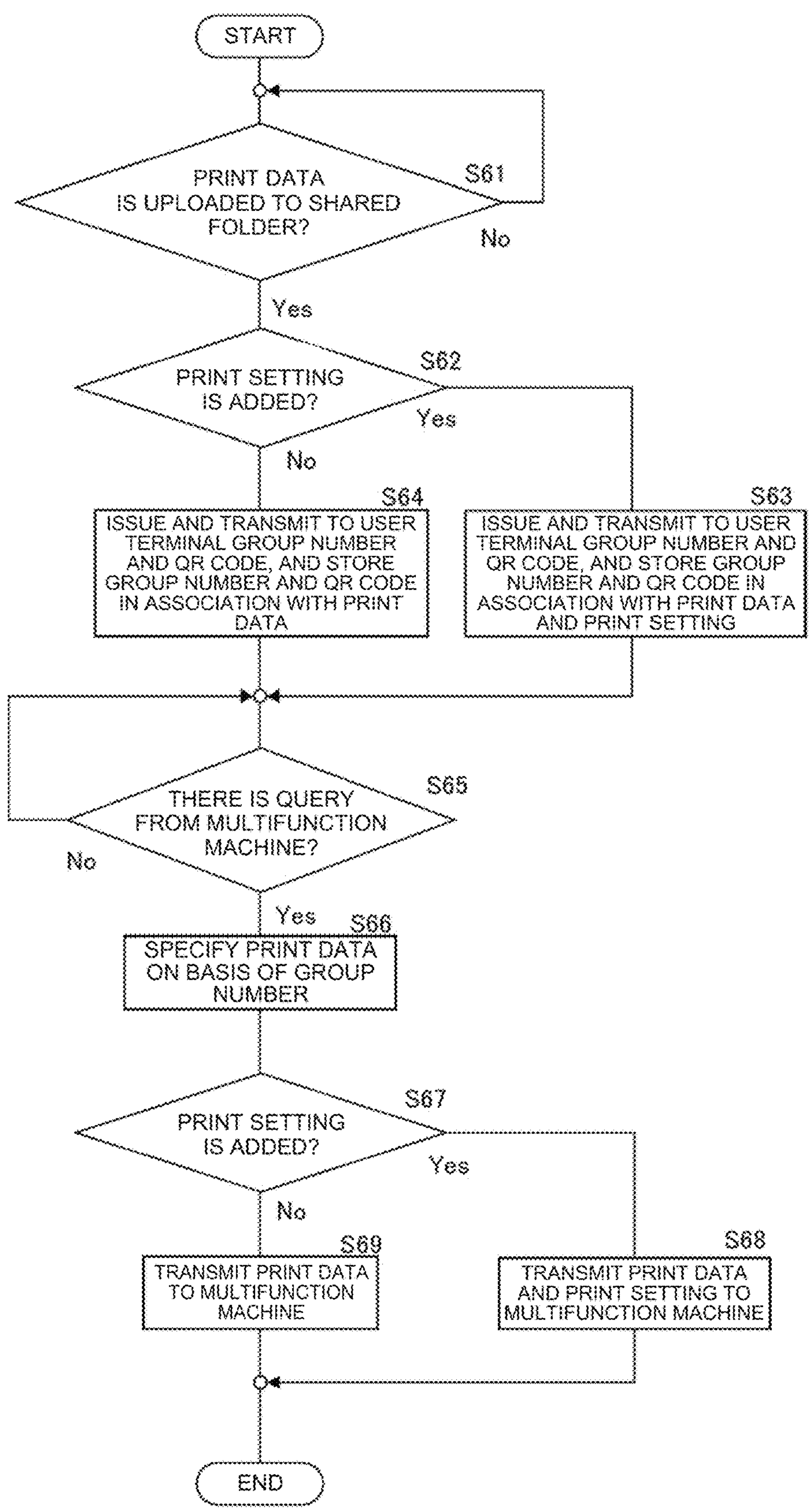
FIG. 18 is a flowchart illustrating a flow of registration of print data to a shared folder of the server from the user terminal, issuance and transmission of a group number and a QR code by the server, and transmission processing of the print data to the digital multifunction machine in the image forming system according to a fourth embodiment of the present disclosure.

FIG. 18 is a flowchart illustrating a flow of registration of print data to the shared folder of the server 3 from the user terminal 2, issuance and transmission of a group number and a QR code by the server 3, and transmission processing of the print data to the digital multifunction machine 1 in the image forming system 100 according to the fourth embodiment of the present disclosure.

In step S61 of FIG. 18, the server 3 determines whether print data for network printing is uploaded to the shared folder from the user terminal 2 (step S61).

When print data is uploaded to the shared folder (when the determination in step S61 is Yes), in step S62, the controller 30 of the server 3 determines whether a print setting is added to the print data (step S62).

When a print setting is added to the print data (when the determination in step S62 is Yes), in step S63, the controller 30 issues a group number and causes the code issuer 36 to issue a QR code for the print data, and stores in the storage 31 the group number and the QR code in association with the print data and the print setting (step S63).

In contrast, when a print setting is not added to the print data (when the determination in step S62 is No), in step S64, the controller 30 issues a group number and causes the code issuer 36 to issue a QR code for the print data, and stores in the storage 31 the group number and the QR code in association with the print data (step S64).

Thereafter, in step S65, the controller 30 determines whether there is a query from the digital multifunction machine 1 (step S65).

When there is a query from the digital multifunction machine 1 (when the determination in step S65 is Yes), in step S66, the controller 30 specifies print data on the basis of a group number acquired from the digital multifunction machine 1 (step S66).

In subsequent step S67, the controller 30 determines whether a print setting is added to the print data (step S67).

When a print setting is added to the print data (when the determination in step S67 is Yes), in step S68, the controller 30 transmits the print data and the print setting to the digital multifunction machine 1 (step S68), and ends the processing.

In contrast, when a print setting is not added to the print data (when the determination in step S67 is No), in step S69, the controller 30 transmits the print data to the digital multifunction machine 1 (step S69), and ends the processing.

Figure 19:
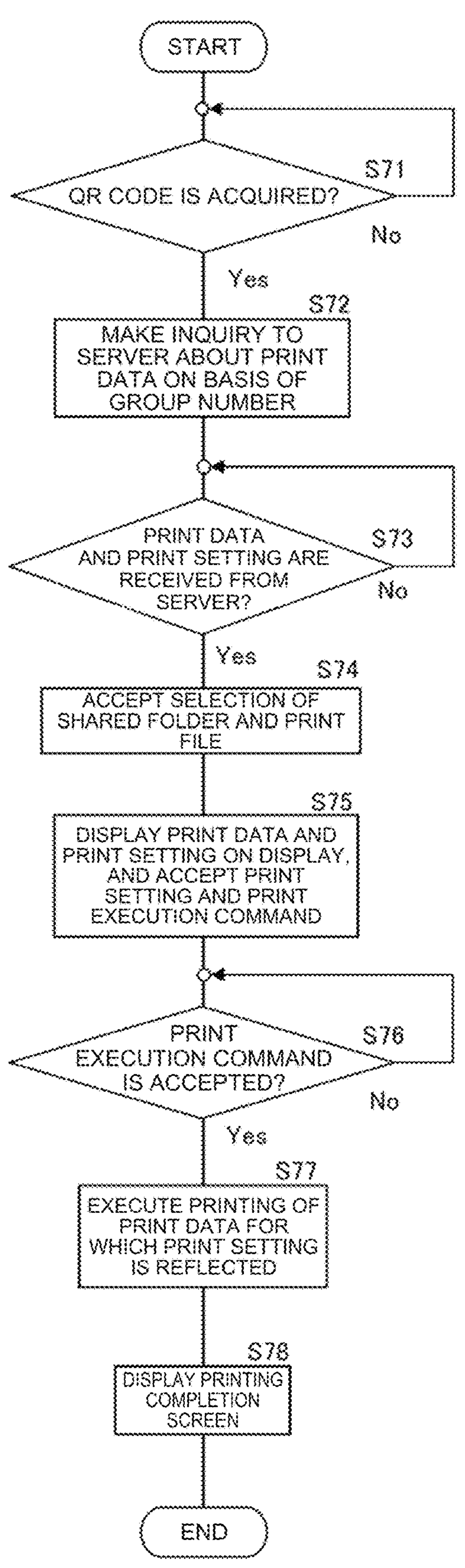
FIG. 19 is a flowchart illustrating a flow of print processing using a QR code in the image forming system according to the fourth embodiment of the present disclosure.

FIG. 19 is a flowchart illustrating a flow of print processing using a QR code in the image forming system 100 according to the fourth embodiment of the present disclosure.

Processing in steps S75 to S78 of FIG. 19 corresponds to the processing in steps S14 to S17 of FIG. 6 (the first embodiment), respectively, and thus the description thereof will be omitted. Processing in steps S72 and S74 of FIG. 19, which is not illustrated in FIG. 19, will be described here.

In step S71 of FIG. 19, the controller 10 of the digital multifunction machine 1 determines whether the code reader 18 acquires a QR code (step S71).

When the code reader 18 acquires a QR code (when the determination in step S71 is Yes), in step S72, the controller 10 makes an inquiry to the server 3 about print data on the basis of a group number acquired from the QR code (step S72).

Next, in step S73, the controller 10 determines whether print data and a print setting are received from the server 3 (step S73).

When print data and a print setting are received from the server 3 (when the determination in step S73 is Yes), in step S74, the controller 10 accepts a selection of a shared folder and a print file (step S74).

Figure 20:
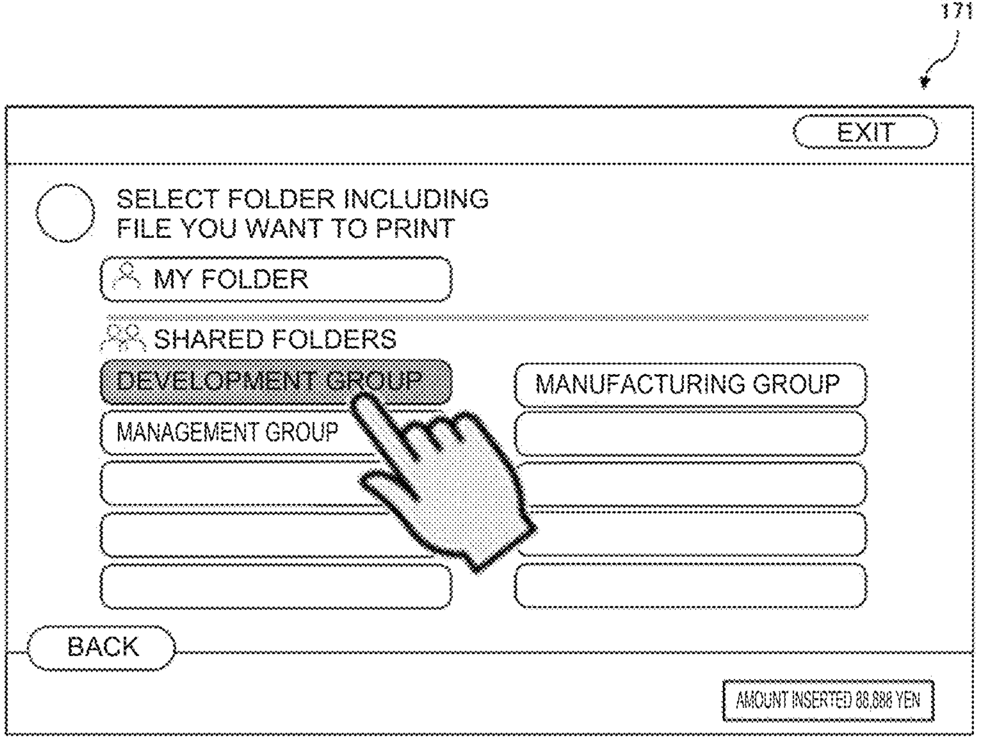
FIG. 20 is an example of a selection screen when there are multiple shared folders in the image forming system according to the fourth embodiment of the present disclosure.

FIG. 20 is an example of a selection screen when there are multiple shared folders in the image forming system 100 according to the fourth embodiment of the present disclosure.

In the example of FIG. 20, in addition to each user-specific “my folder,” shared folders such as “development group,” “manufacturing group,” and “management group” are displayed on the display 171.

When the user selects an appropriate shared folder, the screen transitions to the print file selection screen as in FIG. 17. When the user presses a “next” button after selecting a desired print file in the print file selection screen, the screen transitions to a print setting completion screen.

In this manner, the digital multifunction machine 1 capable of executing printing by network printing more easily and quickly than ever before can be realized only by uploading print data to a shared folder of a group such as a company and reading a QR code.

Preferred aspects of the present disclosure also include combinations of any of the above-described aspects.

In addition to the above-described embodiments, various modifications may be made to the present disclosure. Such modifications should not be construed as falling outside the scope of the present disclosure. The present disclosure should include meanings equivalent to the scope of the claims and all modifications within the scope.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image forming system comprising:

a server;

a user terminal; and an image forming device, which are connected via a network, wherein the server includes:

a server storage that stores print data uploaded in advance in association with user authentication information; and a code issuer that issues a code including the user authentication information, the server transmits the code in response to a request from the user terminal, and, when the user authentication information is received from the image forming device, acquires the print data associated with the user authentication information from the server storage and transmits the print data to the image forming device, the user terminal includes:

a terminal display that displays various types of information to a user, the user terminal, when the code is received from the server, displays the code on the terminal display, the image forming device includes:

a code reader that reads the code to acquire the user authentication information included in the code;

a display that displays various types of information to the user;

an operation acceptor that accepts a command of the user; and an image former that forms an image on the basis of the print data received from the server, the image forming device, when the code reader acquires the user authentication information, transmits the user authentication information to the server, when the print data associated with the user authentication information is received from the server, displays a print setting screen of the print data on the display, when the operation acceptor accepts a print setting from the user, displays, on the display, a print setting completion screen of the print data for which the print setting is reflected, and, when the operation acceptor accepts a print command of the print data, causes the image former to form an image based on the print data, the server storage stores print data uploaded in advance in association with group authentication information in which multiple pieces of user authentication are grouped, the code issuer issues a code including the group authentication information, the server, when the group authentication information is received from the image forming device, acquires the print data associated with the group authentication information from the server storage and transmits the print data to the image forming device, and the image forming device, when the print data is received from the server, displays a shared folder associated in advance with the group authentication information on the display, and, when the operation acceptor accepts a selection of the shared folder, displays a print setting screen of the print data on the display.

2. The image forming system according to claim 1, wherein the server storage, when a print setting is added to print data uploaded in advance, stores the print data and the print setting in association with user authentication information, the server, when the user authentication information is received from the image forming device, acquires the print data and the print setting associated with the user authentication information from the server storage and transmits the print data and the print setting to the image forming device, and the image forming device, when the print data and the print setting are received from the server, displays, on the display, a print setting completion screen of the print data for which the print setting is reflected, and, when the operation acceptor accepts a print command from a user, causes the image former to form an image based on the print data.

3. The image forming system according to claim 1, wherein the server storage stores a print history for each piece of the user authentication information, and, when a print setting is not added to print data uploaded in advance, stores a print setting based on the print history associated with the print data together with the print data in association with the user authentication information, and the image forming device causes the image former to form an image based on the print data, and then, transmits the print history of the print data to the server.

4. The image forming system according to claim 1, wherein the server storage stores multiple pieces of print data uploaded in advance in association with user authentication information, the server, when the user authentication information is received from the image forming device, acquires the multiple pieces of print data associated with the user authentication information from the server storage and transmits the multiple pieces of print data to the image forming device, and the image forming device, when the multiple pieces of print data are received from the server, displays a list of the multiple pieces of print data on the display, and, when the operation acceptor accepts a selection of print data to be printed among the multiple pieces of print data, displays a print setting screen of the print data on the display.

* * * * *